United States Patent [19]

Lau et al.

[11] Patent Number: 5,042,398

[45] Date of Patent: Aug. 27, 1991

[54] REFRIGERATOR SHELF SUPPORT METHOD AND APPARATUS

[75] Inventors: Robert G. Lau, Knight Township, Vanderburgh County, Ind.; Sam D. Lively, Fort Smith, Ark.; Vay G. Johnson, Poteau, Okla.; John F. Cobb, Van Buren, Ark.

[73] Assignee: Whirlpool Corporation, Benton Harbor, Mich.

[21] Appl. No.: 649,236

[22] Filed: Jan. 29, 1991

Related U.S. Application Data

[63] Continuation of Ser. No. 429,069, Oct. 30, 1989, abandoned.

[51] Int. Cl.⁵ .............................................. A47B 9/00
[52] U.S. Cl. .................................... 108/108; 108/110; 248/243; 403/252; 211/190; 211/187
[58] Field of Search ................. 312/321.5, 108, 265.4; 211/190, 187, 191; 108/108, 109, 110, 111; 403/247, 252, 264

[56] References Cited

U.S. PATENT DOCUMENTS

| | | | |
|---|---|---|---|
| 1,806,642 | 5/1931 | Ohnstrand | 248/243 |
| 3,113,358 | 12/1963 | Zell et al. | |
| 3,207,100 | 9/1965 | Peacock | 108/108 |
| 3,263,821 | 8/1966 | Klene | 108/108 |
| 3,265,456 | 8/1966 | Woolever | |
| 3,283,467 | 11/1966 | Znamirowski | 403/252 |
| 3,388,884 | 6/1968 | Eggler et al. | |
| 3,469,711 | 9/1969 | Swaneck | 312/138 A |
| 3,647,075 | 3/1972 | Aue | 211/153 |
| 4,074,812 | 2/1978 | Skubic et al. | |
| 4,101,108 | 7/1978 | Klien | |
| 4,189,796 | 2/1989 | Gutner | |
| 4,352,478 | 10/1982 | Loew | |
| 4,801,182 | 1/1989 | Metcalfe | |

Primary Examiner—Kenneth J. Dorner
Assistant Examiner—Gerald A. Anderson
Attorney, Agent, or Firm—Wood, Phillips, Mason, Recktenwald & Vansanten

[57] ABSTRACT

A refrigeration apparatus includes a door shelf support system comprising an inner door panel and removable shelf trim pieces. The inner door panel includes vertical dikes having vertically spaced slots. The shelf trim piece includes rearwardly extending hooks receivable in the slots and having raised hemispheric detents which cooperate with the slots to provide a snap fit between the inner door panel and the hooks to provide a tight fit which ensures that the shelves stay in place during shipment and maintain the desired snug fit during the useful life.

14 Claims, 2 Drawing Sheets

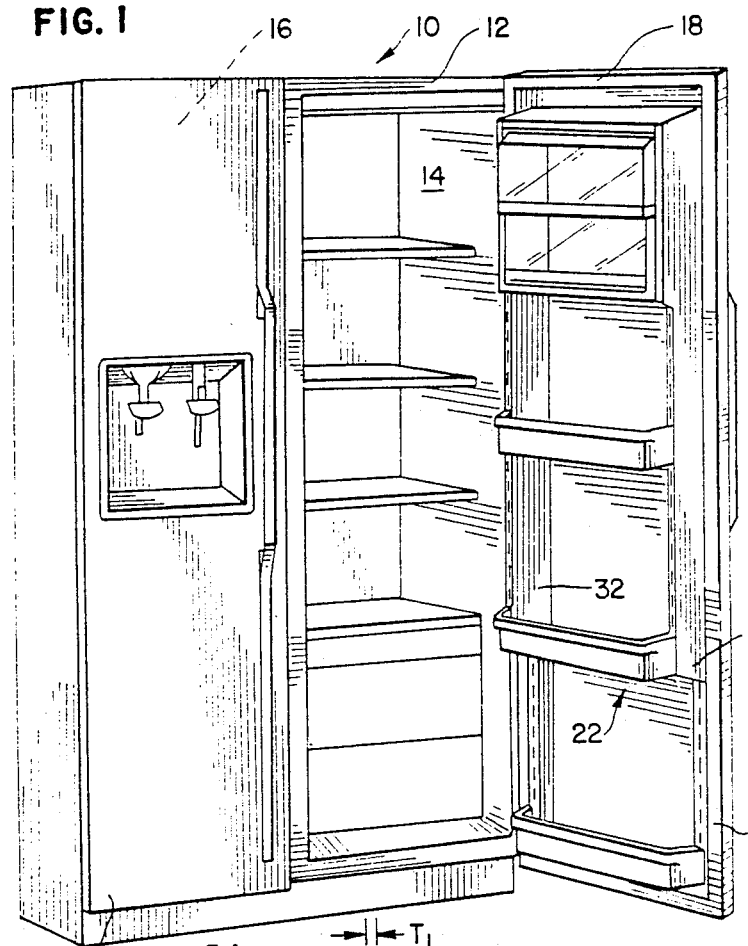
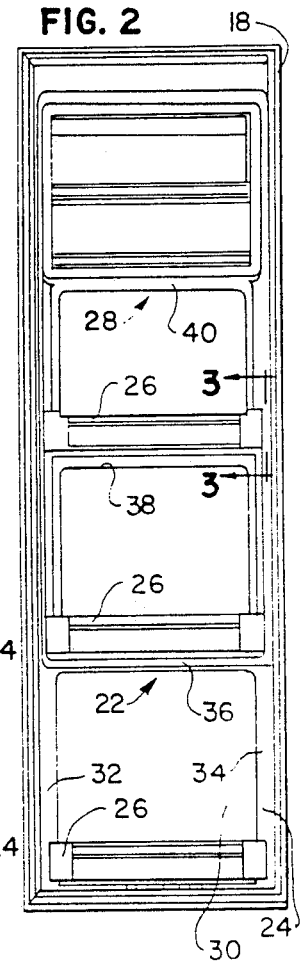
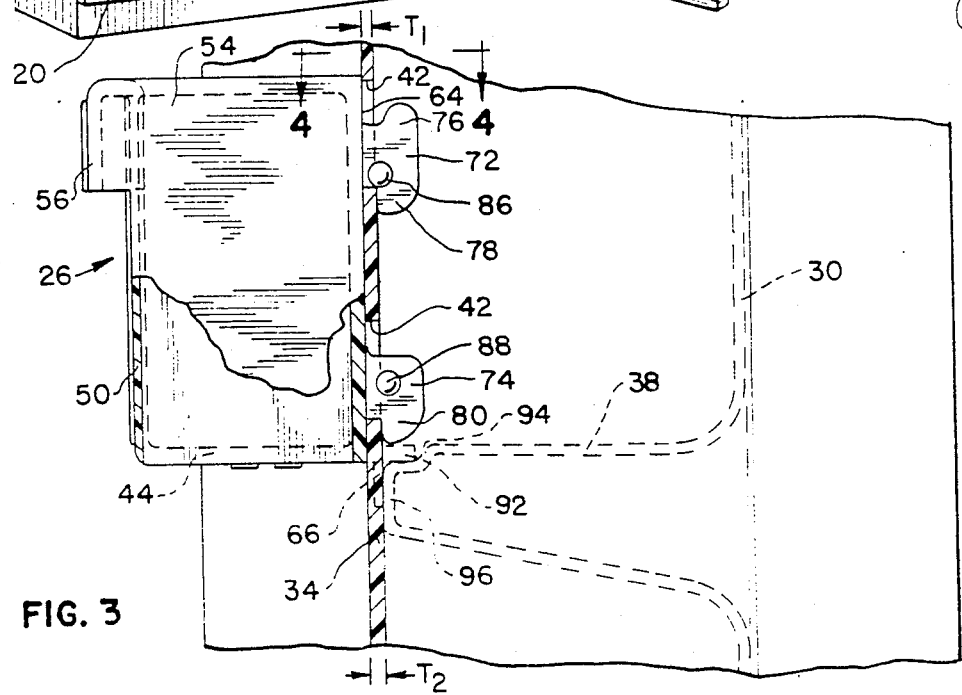
FIG. 1
FIG. 2
FIG. 3

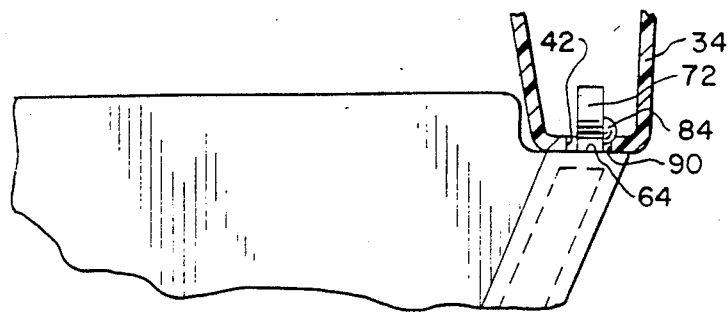
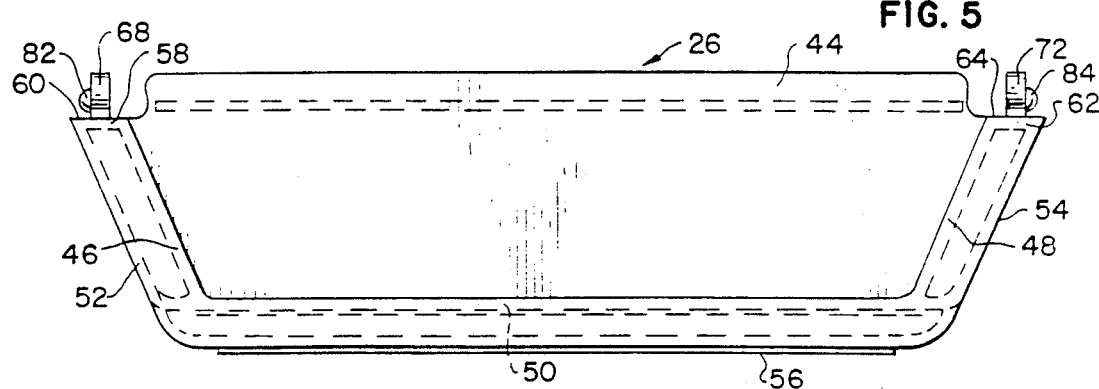
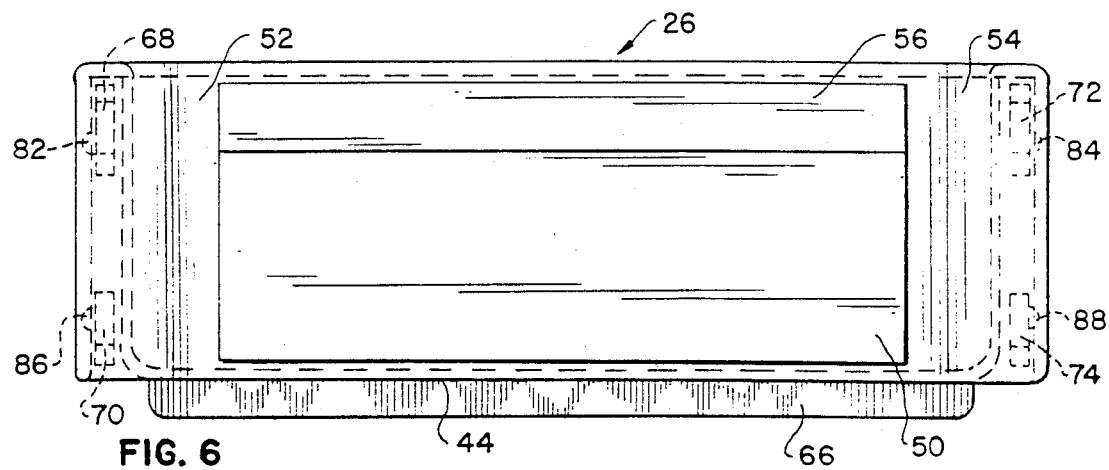
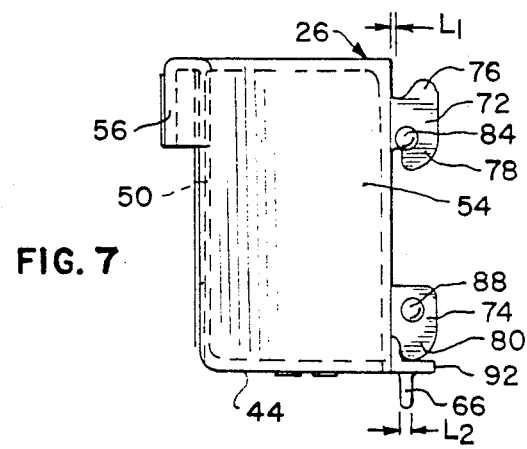

1

REFRIGERATOR SHELF SUPPORT METHOD AND APPARATUS

This application is a continuation of application Ser. No. 429,069, filed Oct. 30, 1989, now abandoned.

FIELD OF THE INVENTION

This invention relates to a refrigeration apparatus and, more particularly, to a refrigeration apparatus door shelf support.

BACKGROUND OF THE INVENTION

In one conventional form of a refrigeration apparatus, a refrigerator door includes shelves provided on the inner panel of the door for carrying objects to be refrigerated. Often these shelves are molded integrally to the inner panel. Alternatively, the shelves may comprise removable shelf trim pieces having rearwardly extending hooks received in slots in inner door panel dikes.

It is desirable to provide a snug fit between a refrigerator inner door panel and a door shelf trim piece mounted thereto. However, this fit is often loose due to large variations in the thickness of the inner door panel, which gives a lesser perceived quality to the door shelf trim, and also results in the door shelf trim piece being easily dislodged.

The present invention overcomes one or more of the above problems, in a novel and simple manner.

SUMMARY OF THE INVENTION

In accordance with the present invention, a refrigerator cabinet shelf trim piece provides a snap fit to an inner door panel to prevent the same from being accidentally dislodged as well as providing a snug fit.

Broadly, there is disclosed herein a door shelf support for a refrigeration apparatus having a cabinet defining a refrigerated space and a door for providing selective access to the space. The door shelf support comprises an inner door panel including parallel, vertical dikes. Each dike has a plurality of vertically spaced rectangular slots. A shelf trim piece includes opposite, vertical side walls. Each side wall defines a rear flat surface and has two vertically spaced, downwardly extending hooks extending from the flat surface. The hooks are received in two of the slots for supporting the trim piece on the door panel. Each hook includes a sidewardly extending raised projection wherein the inner door panel is wedged between the raised projections and the flat surface incident to the hooks being received in the slots.

In one form, the hooks comprise resilient plastic hooks.

In another form, the inner door panel comprises a panel formed of resilient plastic.

In one aspect of the invention the hooks and raised projections have a combined thickness substantially similar to the width of the slots.

In another aspect of the invention the raised projections on the two side walls are spaced a distance greater than a distance between slots on the two dikes.

According to a further aspect of the invention the raised projections are spaced from the flat surface a distance less than a thickness of the inner door panel.

According to another aspect of the invention the raised projections from the two hooks on each side wall are spaced different distances from the flat surface.

More specifically, the invention comprehends the door shelf support comprising an inner door panel having a wall of at least one selected thickness and including elongate, parallel, vertical dikes, each dike having a plurality of vertically spaced, longitudinally extending rectangular slots. The shelf trim piece includes a bottom shelf support and a front wall connecting opposite, vertical side walls. Each side wall defines a rear flat surface and has two vertically spaced, downwardly extending hooks extending from the flat surface. The hooks are received in two of the slots for supporting the trim piece on the door panel. Each hook includes a sidewardly extending raised hemispheric detent spaced from the flat surface a selected distance related to the wall thickness wherein the inner door panel is wedged between the detents on the flat surface incident to the hooks being received in the slots.

In one form, the wall comprises a varying thickness wall, and the detents from the two hooks on each side wall are spaced different distances from the flat surface according to the varying wall thickness.

The invention further comprehends a method of providing a snap fit between an inner door panel and a shelf trim piece of a refrigeration apparatus having a cabinet defining a refrigerated space and a door for providing selective access to the space. The method comprises the steps of forming the inner door panel to include parallel, vertical dikes, each dike having a plurality of vertically spaced rectangular slots; providing a shelf trim piece to include opposite, vertical side walls, each side wall defining a rear flat surface and having two vertically spaced, downwardly extending hooks extending from the flat surface, each hook including a sidewardly extending raised projection and inserting the hooks in selected ones of the slots to provide a snap fit support with the inner door panel wedged between the raised projection and the flat surface.

In one form of the method, the inserting step includes deforming the hooks and registering the hooks with the slots so that the raised projections retain the hooks in the slots when the hooks are no longer deformed.

In another form of the method, the inserting step includes deforming the dikes and registering the hooks with the slots s that the raised projections retain the hooks in the slots when the dikes are no longer deformed.

Further features and advantages of the invention will readily be apparent from the specification and from the drawings.

BRIEF DESCRIPTION OF THE DRAWINGS

FIG. 1 is a perspective view of a refrigeration apparatus including a door shelf support embodying the invention;

FIG. 2 is an elevational view of the interior side of the fresh food compartment door of the refrigeration apparatus of FIG. 1;

FIG. 3 is a fragmentary sectional view taken along the line 3—3 of 4;

FIG. 4 is a sectional view taken along the line 4—4 of FIG. 3;

FIG. 5 is a plan view of a door shelf trim piece of the refrigeration apparatus of FIG. 1;

FIG. 6 is an elevational view of the door shelf trim piece of FIG. 5; and

FIG. 7 is a side elevational view of the door shelf trim piece of FIG. 5.

DETAILED DESCRIPTION OF THE INVENTION

In the illustrated embodiment of the invention as shown in FIG. 1, a refrigeration apparatus 10 comprises a cabinet 12 providing an above-freezing, or fresh food, compartment 14, and a below-freezing, or freezer, compartment 16. The fresh food compartment 14 is selectively closed by a fresh food compartment door 18. Similarly, the freezer compartment 16 is selectively closed by a freezer compartment door 20. The doors 18 and 20 are hingedly mounted to the cabinet 12, as is well known.

The fresh food compartment door 18 includes a door shelf support 22 embodying the invention. Although not shown, the freezer compartment door 20 may also include a similar door shelf support, as will be apparent to those skilled in the art.

Referring also to FIG. 2, the door shelf support 22 comprises an inner door panel 24 and a plurality of removable shelf trim pieces 26. The door 18 is further provided with fixed door shelf supports 28 of a conventional construction which do not form part of the invention.

The inner door panel 24 is of one-piece molded plastic construction; and includes a rear wall 30 and elongate, raised, parallel, left and right vertical dikes 32 and 34, respectively, adjacent its outer vertical edges. The panel 24 has a nominal thickness on the order of 3.0 millimeters. The inner door panel 30 also includes laterally extending, vertically spaced ledges 36, 38 and 40 extending between the dikes 32 and 34. The ledges 36 and 38 are used in connection with the door shelf support 22 according to the invention. The upper ledge 40 forms part of the fixed shelf support 28.

The use of the ledges 36 and 38 along with the shelf trim piece 26, described below, for the middle and upper of the shelf supports 22 permits the same to be of sufficient depth and strength to support extra large containers such as, for example, gallon-sized containers.

The dikes 32 and 34 have a relatively shallow depth below the lowermost ledge 36 and a greater depth between the lowermost ledge 36 and the uppermost ledge 40. Each dike includes a plurality of vertically spaced, longitudinally extending rectangular slots 42, see FIGS. 3 and 4. Specifically, each dike 32 and 34 includes a pair of such slots 42 closely spaced immediately above the middle ledge 38, see FIG. 3. Although not shown, similar pairs of slots 42 are included in each dike 32 and 34 above the lower ledge 36 and at the bottommost portion of the dikes 32 and 34.

With reference to FIGS. 5-7, the shelf trim piece 26 is of one-piece molded construction. The trim piece 26 includes a bottom wall 44 connecting opposite, vertical left and right inner sidewalls 46 and 48, respectively, and an inner front wall 50. The upper edge of the inner sidewalls 46 and 48 and the top wall 50 are turned outwardly and downwardly to provide left and right outer sidewalls 52 and 54, respectively, and a partial outer front wall 56. The left inner and outer sidewalls 46 and 52 are connected by a left partial rear wall 58 having a rear flat surface 60. Similarly, the right inner and outer sidewalls 48 and 54 are connected by a right partial rear wall 62 having a rear flat surface 64. The bottom wall 44 extends rearwardly of the rear partial walls 58 and 62 and includes a downwardly extending flange 66.

The left rear wall 58 includes upper and lower hooks 68 and 70 extending rearwardly therefrom. Similarly, the right rear wall 62 includes upper and lower hooks 72 and 74 extending rearwardly therefrom. The vertical spacing between the respective upper hooks 68 and 72 and lower hooks 70 and 74 corresponds to the vertical spacing between the slots 42 of each pair, see FIG. 3. The horizontal spacing between the left hooks 68 and 70 and the right hooks 72 and 74 corresponds to the spacing between slots 42 in the opposite dikes 32 and 34.

Each upper hook 68 and 72 is generally T-shaped to include an upwardly extending tongue 76 and a downwardly extending tongue 78, see, for example, FIG. 7. Each lower hook 70 and 74 is L-shaped and includes a downwardly extending tongue 80, see also FIG. 7.

The upper hooks 68 and 72 include sidewardly extending raised projections 82 and 84, respectively. Similarly, the lower hooks 70 and 74 include sidewardly extending raised projections 86 and 88. The raised projections 82, 84, 86 and 88 are in the form of raised hemispheric detents.

The left hook detents 82 and 86 are spaced from the left rear wall surface 60 a selected distance slightly less than the nominal wall thickness of the left dike 32. Similarly, the right hook detents 84 and 88 are spaced from the right rear wall surface 64 a selected distance less than the nominal wall thickness of the right dike 34. The combined thickness of each hook and its associated detent, for example the right upper hook 72 and its detent 84, is selected to be less than the width of the rectangular slots 42. The lateral or horizontal spacing between the outermost portion of opposite left and right raised detents, i.e., 82 and 84, and also 86 and 88, is selected to be slightly greater than the lateral spacing between the outermost edges of the slots 42 in the left and right dikes 32 and 34.

With reference to FIG. 3, the procedure for mounting the shelf trim piece 26 to the inner door panel 30 is described hereinbelow.

The door trim piece 26 is positioned diagonally with the upwardly extending tongues 76 inserted in the uppermost slot 42 of each pair. Thereafter, the door shelf trim piece 26 is pivoted downwardly until the upper hooks 68 and 72 are received in the uppermost of the slots 42 and the lower hooks 70 and 74 are received in the lowermost of the slots 42 of each pair. The trim piece 26 is then moved downwardly so that each downwardly extending tongue 78 and 80 engages the inner side of the dike wall below the slot 42 to support the shelf in position. As a result, an inner edge 92 of the bottom wall 44 is seated in a ridge 94 in the forward edge of the ledge 38, with the bottom wall 44 flush with the ledge 38, and the flange 66 engages a forward wall 96 of the ledge 38, see FIG. 3.

As each hook is inserted in the associated slot, by registering such hook with such slot, either the hook or the dike is deformed owing to the resiliency of the plastic. Specifically, since the lateral spacing between detents is greater than that between slots, as described above, one or the other of the hook and dike must deform to permit insertion. For example, and referring to FIG. 4, when the right upper hook 72 is inserted in the slot 42, either the dike 34 is deformed outwardly, or the hook 72 is deformed inwardly to permit the detent 84 to clear an outer edge 90 of the slot 42. Particularly, a distal part of the detent 84 from the hook 72, comprising an outermost tip of the detent 84, is spaced from the flat surface 64 a select distance greater than a thickness of the dike wall 34. This provides a snap fit which occurs when the detent 84 has sufficiently cleared the slot edge 90, and a snug fit between the hook 72 and the dike 34 resulting from the wall of the dike 34 being wedged between the detent 84 and the right rear flat surface 64 incident to the hook 72 being received in the slot 42 when the dike 34 and/or hook 72 is no longer deformed. This snug or tight fit insures that the shelf trim pieces 26 stay in place during shipment and also maintain the desired fit during the useful life of the refrigeration apparatus 10.

As illustrated in FIG. 3, the nominal wall thickness of the right dike 34 is of a thickness $T_1$ at the uppermost of the two slots 42 of the pair which is thinner than a thickness $T_2$ at the lowermost of of the two slots. This relationship holds true between each slot pair on both dikes 32 and 34 because of the effect of the shelf ledges on the molding of the plastic during the thermoforming process.

Advantageously, and referring also to FIG. 7, the upper hook detent 86 is spaced from the right rear surface 64 a selected distance $L_1$ which is slightly less than the distance $L_2$ between the lower hook raised projection 88 and the rear surface 64 to accommodate the varying wall thickness.

In fact, the distance $L_1$ is slightly less than the thickness $T_1$ and the distance $L_2$ is slightly less than the thickness $T_2$ to provide the above-described wedging.

Although the raised projections described herein comprise hemispheric projections to facilitate removal or insertion, other shapes may also be used in accordance with the invention.

The invention further comprehends the method of providing a snap fit between the inner door panel 30 and the shelf trim piece 26 including the steps of forming the inner door panel 30 with a variable thickness wall to support shelves and the like, and including dikes 32 and 34 formed with slots 42 to receive the shelf hooks 68, 70, 72 and 74 having dimensionally interfering projecting rounded hemispheric detents such as, for example, 82, which cooperate with the slots 42 for a snap fit when the shelf hooks are fittingly inserted in the slots, as discussed above.

Thus, the invention broadly comprehends a method and apparatus for supporting and securing plastic cantilever shelves on a formed plastic inner door liner in a refrigerator.

The foregoing disclosure of the preferred embodiments is illustrative of the broad inventive concepts comprehended by the invention.

We claim:

1. In a refrigeration apparatus having a cabinet defining a refrigerated space and a door for providing selective access to said space, a door shelf support comprising:
   an inner door panel including parallel, vertical dikes, each dike having a plurality of vertically spaced rectangular slots; and
   a shelf trim piece including two opposite, vertical sidewalls, each sidewall defining a rear flat surface and having two vertically spaced, downwardly extending hooks extending from said flat surface and received in two of said slots for supporting said trim piece on said door panel, each hook including a sidewardly extending raised projection having sloped surfaces and a central peak, the peak of the projection from the hook being spaced from said flat surface a distance greater than a thickness of said inner door panel to provide a snap fit connection of said hooks in said slots wherein said inner door panel is wedged between a sloped surface of said raised projections and said flat surface when said hooks are received in said slots.

2. The door shelf support of claim 1 wherein said hooks comprise resilient plastic hooks.

3. The door shelf support of claim 1 wherein said inner door panel comprises a panel formed of resilient plastic.

4. The door shelf support of claim 1 wherein said hooks and raised projections have a combined thickness substantially similar to a width of said slots.

5. The door shelf support of claim 1 wherein the raised projections on said two sidewalls are spaced a distance greater than a distance between slots on said two dikes.

6. The door shelf support of claim 1 wherein a part of said raised projections are spaced from said flat surface a distance less than the thickness of said inner door panel.

7. The door shelf support of claim 1 wherein the raised projections from the two hooks on each sidewall are spaced different distances from said flat surface.

8. In a refrigeration apparatus having a cabinet defining a refrigerated spaced and a door hingedly mounted to said cabinet for providing selective access to said space, a door shelf support comprising:
   an inner door panel comprising a wall having at least one selected thickness and including elongate, parallel, vertical dikes, each dike having a plurality of vertically spaced, longitudinally-extending rectangular slots; and
   a shelf trim piece including a bottom shelf support and a front wall connecting opposite, vertical sidewalls, each sidewall defining a rear flat surface and having two vertically spaced, downwardly extending hooks extending from said flat surface, said hooks being received in two of said slots for supporting said trim piece on said door panel, each hook including a sidewardly extending raised projection having sloped surfaces and a central peak, the peak of the projection being spaced from said flat surface a distance greater than said wall thickness wherein said inner door panel is wedged between a sloped surface of said raised projections and said flat surface when said hooks are received in said slots.

9. The door shelf support of claim 8 wherein a part of said raised projections are spaced from said flat surface a distance less than the wall thickness of said inner door panel.

10. The door shelf support of claim 8 wherein said wall comprises a varying thickness wall.

11. The door shelf support of claim 10 wherein the raised projections from the two hooks on each sidewall are spaced different distances from said flat surface according to the varying wall thickness.

12. The door shelf support of claim 8 wherein said raised projections comprise hemispheric detents.

13. In a refrigeration apparatus having a cabinet defining a refrigerated space and a door for providing selective access to said space, a door shelf support comprising:
   an inner door panel including parallel, vertical dikes, each dike having a plurality of vertically spaced rectangular slots; and
   a shelf trim piece including opposite, vertical sidewalls, each sidewall defining a rear flat surface including two vertically spaced, downwardly extending hooks extending from said flat surface and received in two of said slots for supporting said trim piece on said door panel, at least one said hook including a sidewardly extending raised projection having sloped surfaces and a central peak, the peak of the projection from the hook being spaced from said flat surface a distance greater than a thickness of said inner door panel to provide a snap fit connection of said one hook in said slot wherein said inner door panel is wedged between a sloped surface of said raised projections and said flat surface when said hooks are received in said slots.

14. In a refrigeration apparatus having a cabinet defining a refrigerated spaced and a door hingedly mounted to said cabinet for providing selective access to said space, a door shelf support comprising:
an inner door panel comprising a wall having at least one selected thickness and including elongate, parallel, vertical dikes, each dike having a plurality of vertically spaced, longitudinally extending rectangular slots; and a shelf trim piece including a bottom shelf support and a front wall connecting opposite, vertical sidwalls, each sidewall defining a rear flat surface including two vertically spaced, downwardly extending hooks extending from said flat surface, said hooks being received in two of said slots for supporting said trim piece on said door panel, at least one hook including a sidewardly extending raised projection having sloped surfaces and a central peak, the peak of the projection being spaced from said flat surface a distance greater than said wall thickness wherein said inner door panel is wedged between a sloped surface of said raised projection and said flat surface when said one hook are received in said slot.

* * * * *